United States Patent
Lin et al.

(10) Patent No.: US 7,763,374 B2
(45) Date of Patent: Jul. 27, 2010

(54) MEMBRANE FUEL CELL ELECTRODES INCORPORATED WITH CARBON NANOMATERIAL-SUPPORTED ELECTROCATALYSTS AND METHODS OF MAKING THE SAME

(75) Inventors: Su-hsine Lin, Taoyuan County (TW); Shean-du Chiou, Taoyuan County (TW); Wan-min Huang, Taoyuan County (TW); King-tsai Jeng, Taoyuan County (TW); Chun-ching Chien, Taipei (TW)

(73) Assignee: Atomic Energy Council, Taoyuan (TW)

( * ) Notice: Subject to any disclaimer, the term of this patent is extended or adjusted under 35 U.S.C. 154(b) by 917 days.

(21) Appl. No.: 11/603,045

(22) Filed: Nov. 22, 2006

(65) Prior Publication Data

US 2008/0115875 A1     May 22, 2008

(51) Int. Cl.
*H01M 4/96*     (2006.01)
*H01M 8/00*     (2006.01)

(52) U.S. Cl. .............. 429/42; 429/40; 429/43; 429/12

(58) Field of Classification Search .......... 429/42, 429/40, 43, 12
See application file for complete search history.

(56) References Cited

U.S. PATENT DOCUMENTS

| | | | |
|---|---|---|---|
| 2003/0228522 A1* | 12/2003 | Yang et al. | 429/306 |
| 2006/0141313 A1* | 6/2006 | Nomura et al. | 429/30 |
| 2007/0045106 A1* | 3/2007 | Yang et al. | 204/291 |

\* cited by examiner

*Primary Examiner*—Patrick Ryan
*Assistant Examiner*—Helen O Conley
(74) *Attorney, Agent, or Firm*—Jackson IPG PLLC

(57) ABSTRACT

Fuel cell electrodes are fabricated on electrode base substrates. The electrode substrates can be evenly and uniformly covered with electrocatalysts, which are supported on carbon nanomaterials, and ionomers by means of filtration and pressing. The electrodes can be used as anodes or cathodes for membrane fuel cells, such as DMFC and PEMFC.

17 Claims, 4 Drawing Sheets

US 7,763,374 B2

MEMBRANE FUEL CELL ELECTRODES INCORPORATED WITH CARBON NANOMATERIAL-SUPPORTED ELECTROCATALYSTS AND METHODS OF MAKING THE SAME

FIELD OF THE INVENTION

The present invention relates to fabrication of fuel cell electrodes for membrane fuel cell applications; more particularly, relates to fabrication of membrane fuel cell electrodes using various electrocatalysts supported on a variety of carbon nanomaterials (CNMs).

DESCRIPTION OF THE RELATED ARTS

A membrane fuel cell (MFC) can be a direct methanol fuel cell (DMFC) or a hydrogen proton exchange membrane fuel cell (PEMFC), which is an electrochemical energy conversion, or power generation, device using a proton exchange membrane (PEM), e.g., Nafion 117, as a solid polymer electrolyte (SPE). Such a fuel cell belongs to an acid-type membrane fuel cell, which needs to use corrosion-resistant electrocatalysts of platinum group, e.g., Pt (platinum) and Pt—Ru (platinum-ruthenium). Also, there is an alkaline-type membrane fuel cell incorporated with an anion exchange membrane (conducting $OH^-$), e.g., AHA membrane of Tokuyama, Japan, as an SPE, which is able to use low-cost electrocatalysts of non-platinum group, such as Fe—Ni (iron-nickel) and Fe—Co—Ni (iron-cobalt-nickel), under a less corrosive environment.

An electrochemical nano-catalyst (or electrocatalyst) used in an MFC is generally uniformly distributed and adhered as nano-particles on a conductive carbon black powder surfaces. The conductive carbon black powder, such as Vulcan XC-72, acts as an electrocatalyst support and has a function to transfer electron or to carry current. In general, there are three conventional approaches to fabricate a catalyst layer on an MFC electrode:

(a) Coating an electrocatalyst layer directly onto an ion exchange membrane;

(b) Coating an electrocatalyst layer on a transferring substrate first and then transfer-printing onto an ion exchange membrane; and (c) Coating an electrocatalyst layer on an electrode base substrate to be directly hot-pressed onto an ion exchange membrane.

The means used in coating electrochemical nano-catalysts on electrode surfaces for these three conventional approaches generally include brushing, spraying and net-printing, with the use of appropriate ionomers and/or Teflon suspension as binding agents. The main purpose is to obtain a well-bonded, thin and uniform electrocatalyst layer for minimizing the amount of electrocatalyst required and enhancing the utilization efficiency of the electrocatalyst in the electrode.

Recently, a variety of carbon nano-materials, such as carbon nanotube (CNT), carbon nanohorn (CNH), and carbon nanofiber (CNF), have been developed as a new generation of membrane fuel cell electrocatalyst support materials due to their distinctive characteristics, including high electrical conductivities and excellent corrosion resistances. However, these carbon nano-materials are generally very fluffy and bulky, and their sizes are much larger than those of the commonly used conductive carbon black powders. The electrocatalyst layers obtained through the conventional coating methods are usually too thick in dimensions as well as too loose in structures. In addition, a substantial amount of ionomer solution is generally required in the fabrication of a workable electrode, which results in both high electrical and high ionic resistances. All these drawbacks, in turn, give rise to poor performances of the membrane fuel cells, particularly DMFCs. Hence, the prior arts do not fulfill users' requests for practical applications.

SUMMARY OF THE INVENTION

The main purpose of the present invention is to fabricate electrodes using electrochemical nano-catalysts supported on carbon nanomaterials, and the electrodes are used as anodes or cathodes of acid-type, or alkaline-type, membrane fuel cells according to the compositions of the electrochemical nano-catalysts.

To achieve the above purpose, the present invention relates to methods for fabrication of fuel cell electrodes using various electrocatalysts supported on a variety of carbon nanomaterials. These electrode fabrication methods comprise common steps for each method, including: (a) adding a carbon nanomaterial-supported electrochemical nano-catalyst, an ionomer solution, and a solvent together; (b) obtaining a well-mixed electrocatalyst mixture through a supersonic oscillation and a high-speed stirring; (c) depositing an electrode base substrate on a funnel of a filtering device and pouring the electrocatalyst mixture into the funnel for filtering out the electrocatalyst on the electrode base substrate and, at the same time, obtaining a filtrate; (d) re-filtering the collected filtrate for several times until obtaining a clear liquid; (e) obtaining the electrode base substrate to be covered with a plastic film and then to be pressed under room temperature; and (f) drying the electrode substrate in air to obtain an electrode for a membrane fuel cell. Accordingly, a method for fabrication of an electrode with a uniform catalyst layer containing a carbon nanomaterial-supported electrocatalyst and an ionomer is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
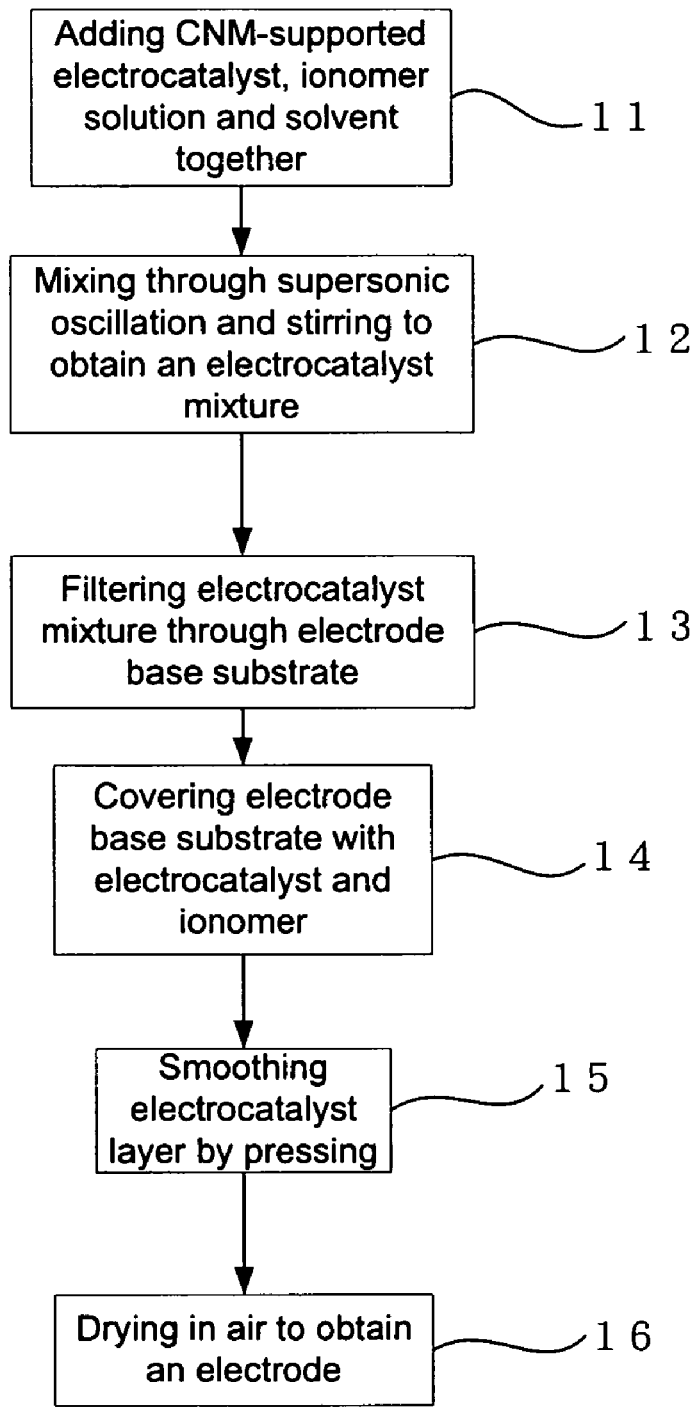
FIG. 1 is the view showing the flow chart of the preferred embodiment according to the present invention.
Figure 2:
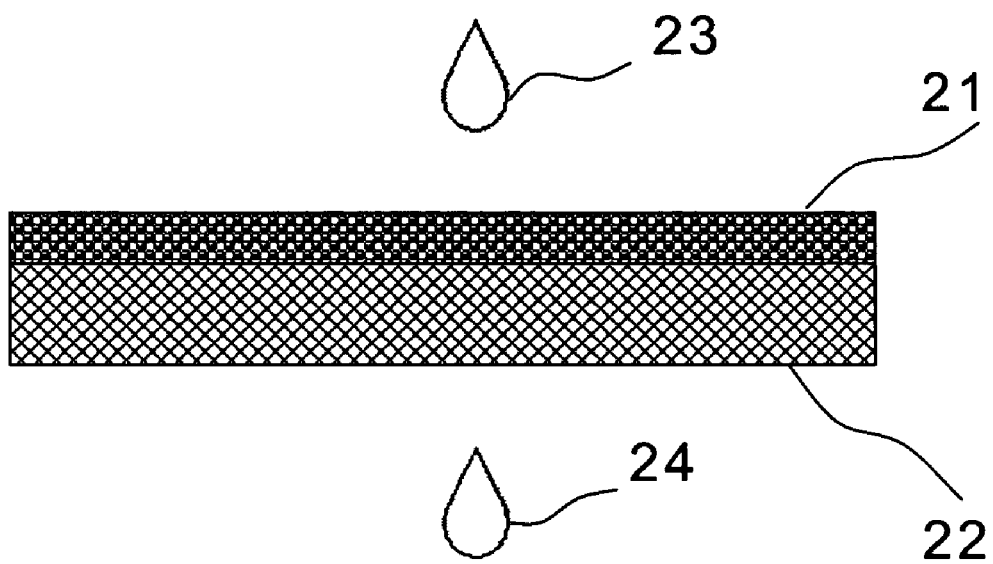
FIG. 2 is the view showing step (a) to step (d)
Figure 3:
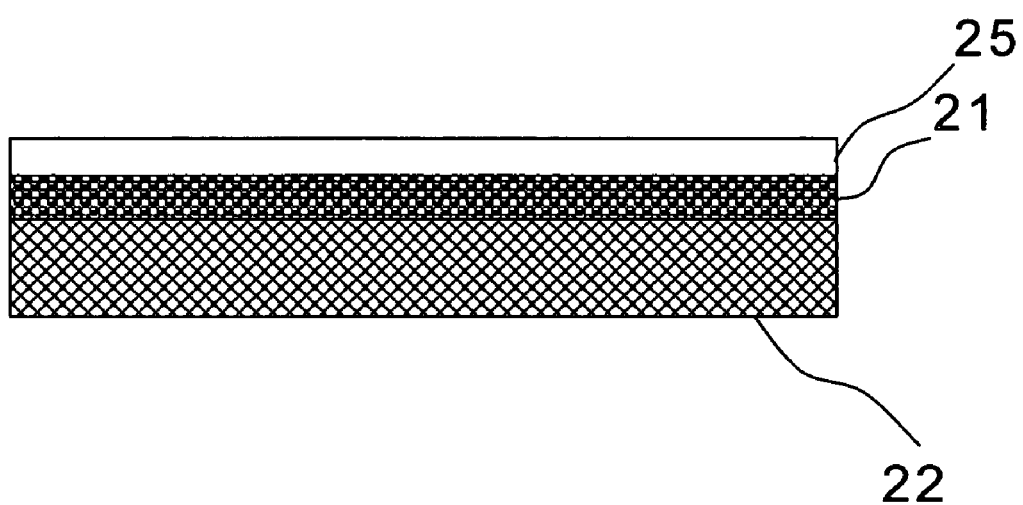
FIG. 3 is the view showing step (e) and step (f)

Please refer to FIG. 1, FIG. 2 and FIG. 3, which are composed of a view showing a flow chart, a view showing step (a) to step (d), and a view showing step (e) and step (f), according to the present invention. As shown in the figures, the present invention relates to novel methods for fabrication of membrane fuel cell electrodes. Each electrode fabrication method comprises the same common steps:

(a) Adding a carbon nanomaterial-supported electrochemical nano-catalyst, an ionomer solution and a solvent together.

11: Therein, the carbon nanomaterial is carbon nanotube (CNT), carbon nanofiber (CNF), carbon nanocoil (CNC) or carbon nanohorn (CNH) and has a single-wall structure or a multi-wall structure; the electrochemical nano-catalyst is a nano-catalyst of platinum group, such as Pt and Pt—Ru, or non-platinum group, such as Fe—Ni and Fe—Co—Ni; the ionomer transfers ions and also acts as a bonding agent at the electrocatalyst layer; the ionomer solution contains a cation exchanger or an anion exchanger; the cation exchanger can be a perfluorinated sulfonic acid resin (Nafion) suspension; the solvent can be isopropyl alcohol (IPA), deionized water (DI), or their mixtures; and the electrochemical nano-catalyst and the ionomer have a dry weight ratio of 2:1 to 1:4.

(b) Mixing through oscillating and stirring 12: A well mixed electrocatalyst mixture is obtained from the above components through a supersonic oscillation and a speedy stirring.

(c) Filtering electrocatalyst mixture through electrode base substrate 13: An electrode base substrate 22 is deposited on a funnel of a filtering device (not shown in the figure.) Then the mixture is poured on the electrode base substrate 22 into the funnel of the filtering device for filtering out the electrocatalyst, together with the ionomer, on the electrode base substrate 22 and then a filtrate 24 is obtained and collected. Therein, the electrode base substrate 22 is a carbon paper, a carbon cloth with or without hydrophobic treatment, or a non-catalyzed gas diffusion electrode; the electrode base substrate 22 has an air permeating layer; and the filtering device is a pressing filtering device operated under a positive pressure, or a vacuum filtering device operated under a negative pressure.

(d) Coating the electrode base substrate with electrocatalyst and ionomer 14: The filtrate 24 is re-filtered for several times until a limpid filtrate 24 is obtained, so that an electrocatalyst layer is fully covered on top of the electrode base substrate. Therein, the electrocatalyst layer has a buckypaper structure obtained by entwining carbon nanotubes together and bonding with ionomer, and the buckypaper structure has a good conductivity.

(e) Smoothing the electrocatalyst layer of the electrode 15: The coated electrode base substrate 22 is taken out to be covered with a plastic film 25. To smooth the electrocatalyst layer 25, the electrode substrate 22 covered with the plastic film 25 is pressed at 2-10 atmospheric pressure under room temperature.

(f) Obtaining an electrode 16: After drying the pressed electrode base substrate 22 in air, an electrode for an MFC is obtained.

Through the above common steps, as well as the use of various electrocatalysts, electrode base substrates, carbon nanomaterials and solvents, novel methods for fabrication of electrodes having electrocatalysts supported on carbon nanomaterials are obtained. According to the various electrocatalysts used, the electrodes can be applied as anodes or cathodes for acid-type or alkaline-type membrane fuel cells.

EXAMPLE 1

The present invention fabricates an anode of a DMFC using a carbon nanotube-supported electrochemical nano-catalyst of 40 wt % Pt-20 wt % Ru/CNT (wt %, weight percent) through the following steps:

(a) A weighted amount of 0.473 grams (g) of an in-house prepared 40 wt % Pt-20 wt % Ru/CNT is added with 10 milliliters (ml) of a 10 wt % perfluorinated sulfonic acid resin (Nafion) solution, 5 ml of isopropyl alcohol (IPA) and 15 ml of deionized water in a beaker.

(b) The beaker is supersonically oscillated for 10 minutes (min) and then is rapidly stirred for 30 min to form a well-mixed electrocatalyst mixture.

(c) A piece of wet-proofed carbon cloth (ElectroChem: model EC-CC1-061) with a diameter of 9.5 centimeters is used as an electrode base substrate and put on a funnel of a filtering device. Then the electrocatalyst mixture is poured on the electrode base substrate for filtering out an electrcatalyst layer on the electrode base substrate and then a filtrate (filtered liquid) is obtained and collected, where the operating pressure is 1 to 20 millimeters of mercury (mmHg).

(d) The filtrate is re-filtered for five times until a clear liquid is obtained so that the electrode base substrate is fully covered with the CNT-supported electrocatalyst and the ionomer.

(e) After performing the filtration procedure, the coated electrode base substrate is taken out to be covered with a plastic film of polyvinyl chloride (PVC); and then is pressed using a plate pressing machine under 10 atmospheric pressures for 20 min to obtain a smooth electrocatalyst layer.

(f) The pressed electrode base substrate is then dried in air to obtain an anode for an MFC.

EXAMPLE 2

The anode fabricated according to the present invention is applied to a DMFC at 80 degree Celsius (° C.) with a catalyst loading of 4 milligrams per square centimeter ($mg/cm^2$). The cathode of the DMFC is a gas diffusion electrode incorporated with a Pt black/C (Pt black supported on carbon black powder) electrocatalyst of the same catalyst loading. The two electrode and a proton exchange membrane are hot-pressed at 135° C. under 75 atmospheric pressures for 5 min to form a membrane electrode assembly (MEA), where the two electrodes has a size of 1.5 cm×1.5 cm and the proton exchange membrane is a polymer of perfluorinated sulfonic acid resin (Nafion 117). The DMFC is assembled mainly using two graphite end plates, silica rubber gaskets, bolts and nuts.

Figure 4:
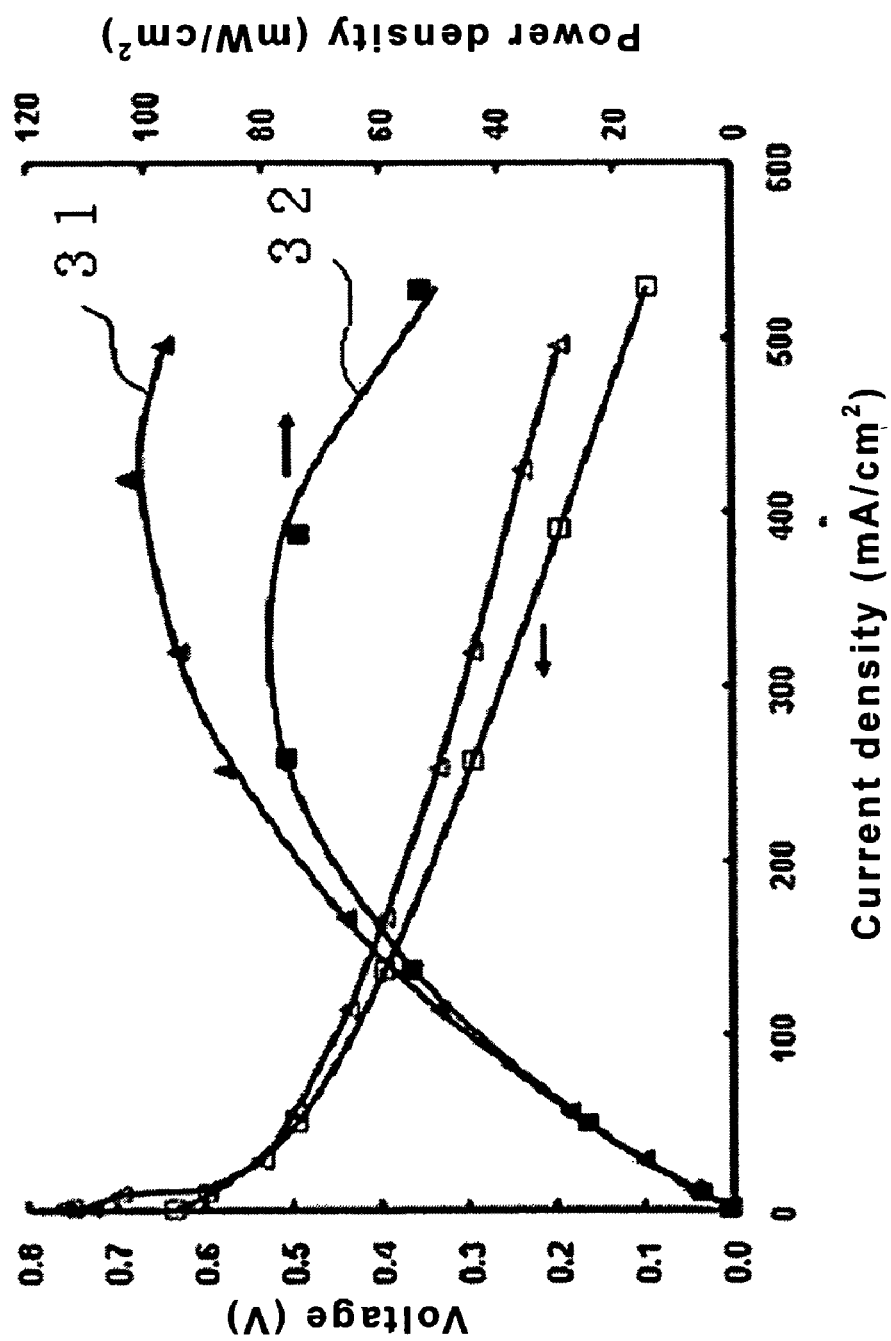
FIG. 4 is the comparison diagram showing the performance curves of two direct methanol fuel cells incorporated with an anode of the present invention and an anode of the conventional fabrication, respectively.

Please refer to FIG. 4, which is a comparison diagram showing the performance curves of two DMFCs. As shown in the figure, a DMFC incorporated with an anode of the present invention is compared to another DMFC incorporated with an anode of conventional fabrication at 80° C. At the anode, 1M of $CH_3OH$ supplied at a rate of 40 milliliters per minute (ml/min) is used as a fuel; and at the cathode, air supplied at a rate of 200 ml/min is used as an oxidant. In the diagram, the performance curve 3 is for the DMFC using the anode fabricated according to the present invention, while the performance curve 4 is for the DMFC using a conventional anode. It is clear that the anode fabricated according to the present invention exhibits a much better effect on a DMFC performance than that of the conventional anode. As a result, it is evidenced that the present invention is fit to be applied to an MFC, such as a DMFC or a proton exchange membrane fuel cell (PEMFC).

To sum up, the preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for fabricating electrodes, having electrochemical nano-catalysts supported on carbon nanomaterials, for use in membrane fuel cells comprising the steps of:

(a) Adding an electrochemical nano-catalyst synthesized on a carbon nanomaterial with an ionomer solution and a solvent together in a container;

(b) Obtaining a well-mixed electrocatalyst mixture through a supersonic oscillation and a speedy stirring;

(c) Depositing an electrode base substrate on a funnel of a filtering device and pouring said electrocatalyst mixture on said electrode base substrate for filtering out an electrocatalyst layer and thus obtaining a filtrate;

(d) Re-filtering said filtrate for several times until obtaining a limpid liquid;

(e) Obtaining said coated electrode base substrate to be covered with a plastic film and then to be pressed under a pressure at a room temperature; and (f) Drying said electrode substrate to obtain an electrode for a membrane fuel cell (MFC).

2. The method according to claim 1, wherein said carbon nanomaterials comprising carbon nanotube, carbon nanofiber, carbon nanocoil and carbon nanohorn.

3. The method according to claim 1, wherein said carbon nanomaterials have wall structures consisting of a single-wall structure and a multi-wall structure.

4. The method according to claim 1, wherein, said electrochemical nano-catalysts consist of nano-catalysts of platinum group and nano-catalysts of non-platinum group.

5. The nano-catalysts of platinum group, according to claim 4, are selected from a group comprising Pt and Pt—Ru.

6. The non-platinum group nano-catalysts of non-platinum group, according to claim 4, are selected from a group comprising Fe—Ni and Fe—Co—Ni.

7. The method according to claim 1,
wherein said electrochemical nano-catalyst has a metal content between 5 and 80 weight percents (wt %); and
wherein said electrochemical nano-catalyst in a direct methanol fuel cell has a metal content more than 50 wt %.

8. The method according to claim 1, p1 wherein said membrane fuel cells consist of an acid-type MFC having a cation exchange membrane and an alkaline-type MFC having an anion exchange membrane.

9. The method according to claim 1, wherein said an ionomer is selected from a group consisting of a cation ionomer and an anion ionomer.

10. The methods according to claim 9, wherein said cation ionomer comprises a perfluorinated sulfonic acid resin (e.g., Nafion) suspension.

11. The method according to claim 1, wherein said electrochemical nano-catalyst and said ionomer have a dry weight ratio of 2:1 to 1:4.

12. The method according to claim 1, wherein said solution comprising isopropyl alcohol and deionized water.

13. The method according to claim 1,
wherein said supersonic oscillation is processed for 10 minutes (min) and said speedy stirring is processed for 30 min.

14. The method according to claim 1,
wherein said electrode base substrate is selected from a group consisting of carbon paper and carbon cloth, and non-catalyzed gas diffusion electrode.

15. The method according to claim 1, wherein said electrode base substrate is a material with or without hydrophobic treatment.

16. The method according to claim 1,
wherein said electrode substrate has an air permeating layer.

17. The method according to claim 1, wherein said filtering device is selected from a group consisting of a pressing filtering device operated under a positive pressure, and a vacuum filtering device operated under a negative pressure.

* * * * *